Nov. 20, 1945.  F. CARLTON  2,389,413
METHOD OF PREVENTING BACKFLOW OR BACK-SIPHONAGE IN PRESSURE SYSTEMS
Original Filed Sept. 26, 1941
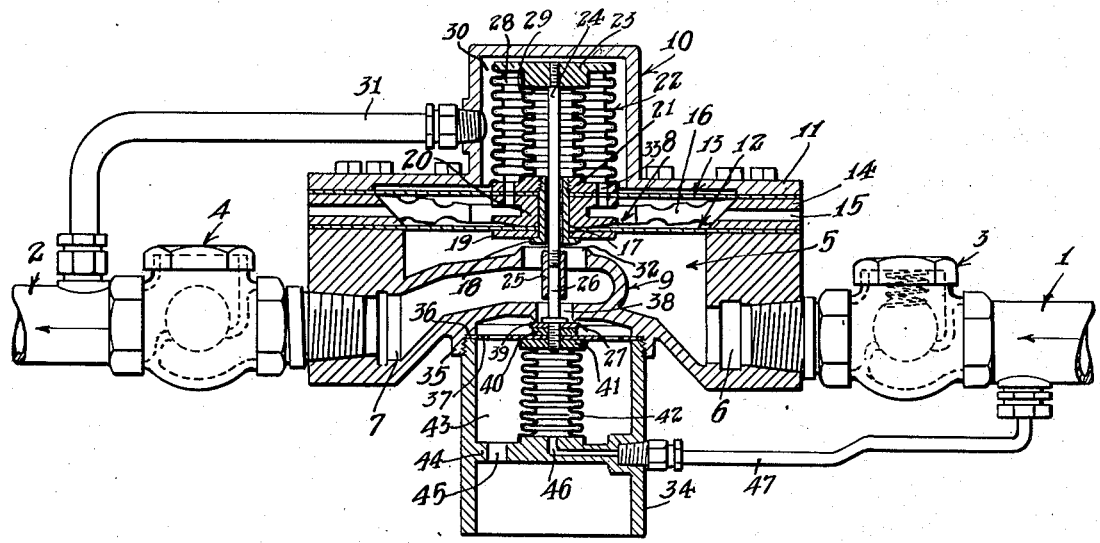
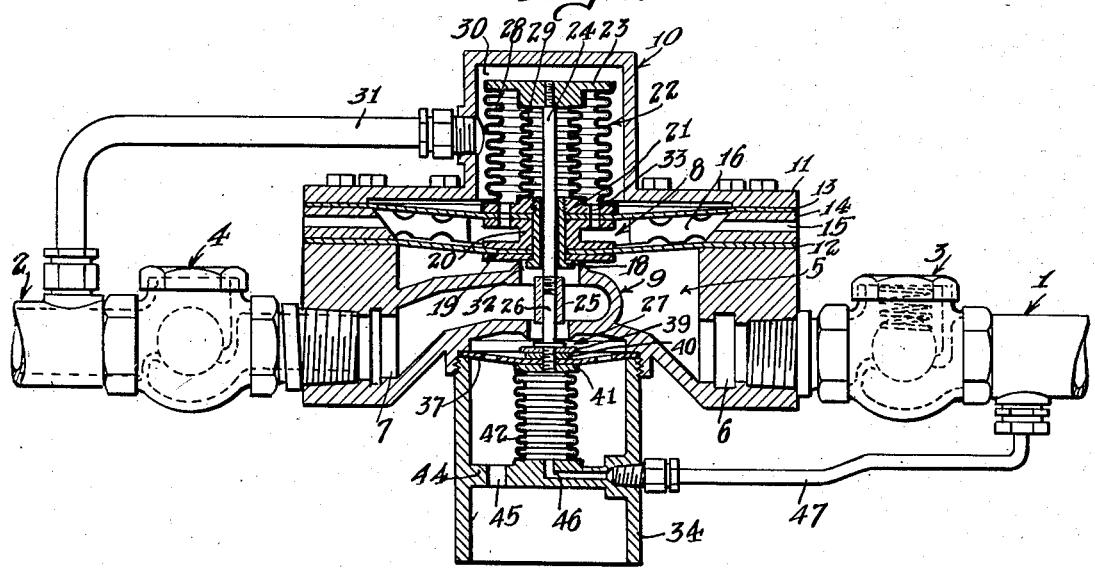
Inventor
Frank Carlton
By Lyon & Lyon
Attorneys Patented Nov. 20, 1945

2,389,413

UNITED STATES PATENT OFFICE 2,389,413

METHOD OF PREVENTING BACKFLOW OR BACK-SIPHONAGE IN PRESSURE SYSTEMS

Frank Carlton, Los Angeles, Calif.

Original application September 26, 1941, Serial No. 412,372. Divided and this application January 17, 1944, Serial No. 518,516

7 Claims. (Cl. 137—78)

This invention relates to a method for preventing a backflow and back-siphonage in a pipe system. This application is a division of my copending application filed September 26, 1941, Serial No. 412,372, for Back siphonage prevention, anti-backflow and vacuum breaking valve and method of operation.

This invention is directed to a method of preventing backflow or back-siphonage particularly in a pipe system normally under pressure to maintain the flow therethrough in the desired direction wherein I provide for the reduction of pressure at a point in the system so that the pressure entering the zone or the induction pressure thereto is maintained greater during normal flow and at the time of cessation of flow than the eduction pressure or the pressure of the fluid leaving the zone.

In this method I also employ a means whereby this zone is drained of fluid before the eduction pressure can rise to, or become equal to, the induction pressure.

In carrying out the method embodying my invention, I employ a means to maintain a pressure differentiation between the said induction and eduction pressures and prefer to drain the zone before the eduction pressure reaches the induction pressure within the limits of the pressure differential.

It is apparent that, by so controlling the pressures, backflow or back siphonage can not occur within the system beyond the said zone because flow of fluid will not occur from a low pressure zone to a high pressure zone.

It is therefore a particular object of this invention to provide a method of controlling the flow through the supply or pipe system wherein there is provided a zone at which there is maintained a pressure differential between the induction pressure of the fluid entering the zone and the eduction pressure of the fluid leaving the zone.

It is another object of this invention to provide a method of controlling the flow within a supply or pipe system in which system there is provided a zone and where the induction pressure entering the zone is maintained higher than the eduction pressure of the fluid leaving the zone and where the zone is drained of fluid at any time where the eduction pressure approaches the induction pressure within the limits of the established pressure differential.

Another object of this invention is to provide a method of controlling the flow through a supply or service system in which there is established a pressure control zone where the pressure of the fluid entering the zone is related to the pressure of the fluid leaving the zone so as to maintain a differential between said pressures and where the pressure of the fluid leaving the zone is maintained below the pressure of the fluid entering the said zone by the pressure differential and wherein means are provided responsive to the differential pressures for draining the zone when the pressure of the fluid leaving the zone and the pressure of the fluid entering the zone approach equality within the limits of the established differential.

Another object of this invention is to provide a method of controlling the flow through a water supply or service pipe system embodying the step of maintaining a differential pressure relationship within the system so that the delivery or induction pressure is in excess of the supply or eduction pressure by an established differential and wherein a portion of the system will be drained between the delivery and supply portions of the system when the supply or eduction pressure approaches a point of equality to the delivery or induction pressure either due to the development of back pressure in the supply or eduction portion of the system or due to the development of back siphonage in the delivery or induction portion of the system.

Other objects and advantages of this invention it is believed will be apparent from the following detailed description as the same is set forth in the accompanying specification and as the same is indicated as being carried out in the preferred form of apparatus illustrated in the accompanying drawing.

In the drawing:

Figure 1 is a side elevation partly in vertical midsection of an apparatus adapted for carrying out the method embodying my invention and illustrating the apparatus in position of normal flow from the induction side at the right to the eduction side at the left.

Figure 2 is a view similar to Figure 1 and illustrating the apparatus in position where the pressure control zone is draining due to the development of the condition of backflow or back-siphoning.

In accordance with the method involving my invention, I prevent backflow or back-siphonage from the eduction to the induction portions of the pipe system by maintaining the fluid pressure in the supply or eduction line during normal flow and at the time of cessation of normal flow below the fluid pressure in the delivery or induction line, In order to so maintain the pressures, I employ what may be defined as a presure differential regulator. By pressure differential regulator I mean a pressure regulator which will, under normal conditions, operate to maintain the pressure in the supply or eduction line below the pressure in the delivery or induction line irrespective of pressure fluctuations in the said delivery line.

In the preferred form of my invention as herein illustrated, I have shown one type of pressure differential regulator which functions due to the maintenance of differential areas against which the fluid pressures within the induction and eduction lines are effective.

The method involving this invention may be carried out through the utilization of the apparatus so illustrated which includes an induction pipe 1 which, for example, may be a line from a water distributing main. The eduction tube 2 may be connected with any service system or device to which water under pressure is delivered. Commonly employed in such a system is an induction check valve 3 and an eduction check valve 4 which normally open in the direction of flow and normally close under a condition of backflow. Between these valves, or between the induction line 1 and the eduction line 2 I establish a pressure differential zone by mounting a chamber device 5. This chamber device 5 has an induction passage 6 and an eduction passage 7 and a main valve 8 operating in conjunction with the dividing partition 9 to separate the chamber member 5 between the induction passage 6 and the eduction passage 7.

I employ means operative in conjunction with the zone established by the chamber member 5 for maintaining a pressure differential between the pressure of the fluid entering this zone through the induction passage 6 and as leaving the eduction passage 7. This pressure differential may be established as a definite pressure drop, i. e., a definite reduction in pressure which prevails irrespective of fluctuations of the pressure in the line 1 and induction passage 6, or as set forth in this preferred example, may be related to the induction and eduction pressures by subjecting a differential pressure regulator to these pressures.

I have herein illustrated one form of pressure regulator at 10 which is housed within the cap 11 of the chamber member 5. The differential regulator as herein illustrated includes an induction pressure diaphragm 12 and an eduction pressure diaphragm 13. Suitable means are provided for holding these diaphragms in spaced relation and for venting the space between the diaphragms to the atmosphere, which means as herein illustrated includes an annular ring 14 having a plurality of transverse bores 15 leading from the atmosphere to the space between the diaphragms 12 and 13. In order to maintain the diaphragms held in the spaced relation defined by the ring 14, there is carried by or secured to the ring a spacing spider 16 which is of a width corresponding substantially to that of the ring 14 and extends diametrically inward toward the center of the diaphragms to prevent their collapsing one against the other. The diaphragms 12 and 13 are secured at their center to the main valve 8 by any suitable means as, for example, by means of the hollow sleeve member 17 provided at one end with a shoulder 18 to bear against a seat member 19 which is mounted upon the sleeve 17. Mounted between the diaphragms 12 and 13, likewise upon the sleeve member 17, is a spacing spool 20. Threaded to the upper end of the sleeve member 17 is a base member 21 of the compound bellows 22. Secured to the head element 23 of the compound bellows 22 is a relief valve rod 24 which extends through the sleeve 17 and is connected at the slide joint 25 to the stem 26 of a relief or discharge valve 27.

The compound bellows 22 includes two concentrically disposed bellows elements 28 and 29 which are secured in fluid-tight relation at their lower ends to the member 21 and at their upper end to the head element 23.

The diaphragm 13, in conjunction with the ring 14 and the valve structure 8, forms a chamber 30 within the cap 11 and this chamber is maintained in communication with eduction fluid by means of the conduit 31 which extends from the chamber 30 to the eduction line 2 beyond the eduction check valve 4, thus the chamber 30 is at all times subject to the pressure of the eduction fluid. The eduction pressure in this chamber 30 is also impressed upon the large diaphragm 13, tending to move the valve 8 to its seating position upon its seat 32 formed around the flow passage formed through the partition 9.

The interior of the bellows 28 is open to atmospheric pressure through the ports 33 formed through the upper flange of the spacing spool 20, the upper diaphragm 13 and the base element 21 of the compound bellows 22. The bellows 29 is therefore subject to atmospheric pressure on its outer surface and upon its inner surface is subject to the pressure of the fluid existing within the passage formed through the partition 9.

The pressure in chamber 30 also acts externally on bellows 28 tending to move the head 23 downwardly and is opposed by the induction pressure inside the bellows 42 and the pressure inside bellows 29. Bellows 28 and 29 are free to move independently of diaphragms 12 and 13, and therefore the discharge or vent valve 27 opens or closes in response to eduction and induction pressures, induction pressure acting to close, and eduction pressure acting to open said relief valve. The induction diaphragm 12 is subjected to the induction pressure within the induction chamber formed in the chamber member 5.

As herein illustrated, the discharge or vent valve 27 is supported within a discharge cylinder 34 which is threaded to the chamber member 5 within the annular thread flange 35. Interposed between the end of the cylinder 34 and the shoulder 36 of the flange 35 is a perforated flexible washer 37. The discharge valve 27 operates to control flow of fluid through the discharge passage 38 formed through the chamber member 5 immediately below the main valve 8 and is operative to discharge fluid from the eduction chamber formed in the chamber member 5 by the partition 9 when the main valve 8 is seated. A discharge valve is carried upon the valve stem 26 and the valve disc 39 thereof is carried upon a disc 40 which is held clamped against the perforated washer 37 which in turn is held seated upon the head element 41 of the discharge bellows 42 by means of threading stem member 26 to the head element 41.

The discharge or vent bellows 42 is housed within a chamber 43 formed by the cylinder member 34. The cylinder member 34 has a transverse partition 44 formed therein in which there is an atmospheric vent port 45. This subjects the exterior of the bellows 42 to atmospheric pressure. The interior of the bellows 42 is subject to the induction pressure through a port 46 formed in the transverse partition 44 and a conduit 47 which is connected with the cylinder element 34 at the port 46 and to the induction line 1 beyond the induction check valve 3.

The method embodying my invention is carried out in this apparatus as follows:

Under normal operation as illustrated in Figure 1, fluid under pressure is transmitted through conduit 47 to the interior of bellows 42, causing relief valve 27 to close. Fluid then passes through the induction check valve 3 into chamber 5, and operating against the under side of the smaller diaphragm 12, raises the main valve 8 from its seat, permitting the fluid to pass the eduction check valve 4 and into the eduction line 2. During this flow, the eduction pressure acts upon the upper side of the larger diaphragm 13 and tends to close the main valve 8, thereby maintaining a predetermined pressure differential between the induction fluid and the eduction fluid during normal flow, and irrespective of any pressure fluctuations which may occur in the induction line 1. This pressure differential is also maintained at the instant of cessation of flow.

After normal flow ceases, should a backflow condition develop due either to the rise of pressure in eduction line 2 or to the drop in pressure in induction line 1, the following action will result. Suppose for example that the eduction pressure rises and that the normal pressure differential is decreased. First, the main valve 8 is simply pressed more firmly into its seat. Further rise in the eduction pressure will cause bellows 28 to compress and open the drain valve 27 slightly, thereby reducing the pressure in passage 7. The relative diameters of bellows 28, 29 and 42 are so proportioned that drain valve 27 will start to open while the eduction pressure is still slightly below the induction pressure. If the eduction pressure continues to rise, the pressure in passage 7 will continue to drop and will finally reach zero when the eduction pressure is a predetermined amount above the induction pressure. In all cases, however, the pressure in passage 7 is below the induction pressure.

I will also assume a backflow condition wherein the eduction check valve 4 has become inoperable, and it is therefore possible for fluid to flow through it in the reverse direction. If the eduction pressure in line 2 approaches the induction pressure in line within the pressure differential, the main valve 8 will close more firmly, but the relief valve 27 will open and drain fluid from passage 7, and also drain the eduction line 2 through the faulty check valve 4. Fluid will continue to drain from relief valve 27 until the proper pressure differential between the induction and eduction pressures has been restored.

It will be observed that as herein illustrated, my method is carried out by maintaining a proportionate pressure differential, that is, a pressure differential which is proportioned to the induction and eduction pressures. However, this is not an essential factor of my invention as obviously other means may be employed for maintaining a pressure differential.

Having fully described my invention and the preferred manner in which the same is to be carried out, it is to be understood that my invention is not limited to the details herein set forth but is of the full scope of the appended claims.

I claim:

1. In a method of preventing backflow in a pipe system in which fluid above atmospheric pressure normally flows from an induction line to an eduction line through a connecting zone, the steps of producing under normal conditions a substantial predetermined pressure differential between the induction line pressure and the eduction line pressure such that there is a tendency for the eduction pressure to be maintained at a predetermined amount below the induction pressure during normal flow and at cessation of normal flow, and draining the zone to the atmosphere when the eduction pressure is less than the induction pressure by an amount less than the predetermined differential, and continuing draining said zone to atmosphere even though the eduction pressure subsequently exceeds the induction pressure until the predetermined differential is again reached.

2. In a method of preventing backflow of liquid in a pipe system in which the liquid above atmospheric pressure normally flows from an induction line to an eduction line through a connecting zone, the steps of maintaining during normal flow and at cessation of normal flow a substantial predetermined pressure differential between the pressure of the liquid entering the zone and the pressure of the liquid leaving the zone such that the pressure of the liquid leaving the zone is maintained below the pressure of the liquid entering the zone irrespective of variations of pressure of the liquid entering the zone and the liquid leaving the zone during normal flow and at cessation of normal flow, and venting the zone to the atmosphere when the pressure of the liquid leaving the zone is less than the pressure of liquid entering the zone by an amount less than the pressure differential existing during normal flow and at cessation of normal flow, and discontinuing the venting upon resumption of the predetermined differential.

3. A method of preventing backflow in a pipe system in which the liquid normally flows from an induction line to an eduction line under pressure higher than atmospheric pressure and flows through a connecting zone between the induction and eduction lines, the steps of maintaining a substantial predetermined pressure differential between the induction line pressure and the eduction line pressure during normal flow and at cessation of normal flow such that the eduction line pressure is maintained below the induction line pressure, and draining liquid from the zone when the eduction pressure is less than the induction pressure by an amount substantially less than the pressure differential existing during normal flow and at cessation of normal flow, and discontinuing draining upon resumption of the predetermined differential.

4. In a method of preventing backflow in a piping system through which water normally flows at a pressure greater than atmospheric pressure from an induction line to an eduction line through a connecting zone having a normally closed atmospheric vent, the steps of establishing a substantial predetermined pressure drop between the induction line pressure and eduction line pressure during normal flow and at cessation of normal flow, and draining the eduction line to atmosphere when the eduction pressure is less than the induction pressure by an amount less than the predetermined differential, and discontinuing the draining upon resumption of the predetermined differential.

5. In a method of preventing backflow in a piping system through which water flows at a pressure greater than atmospheric pressure from an induction line to an eduction line through a connecting zone provided with a normally closed vent, establishing a substantial predetermined pressure drop between the induction line and eduction line pressures during normal flow and at cessation of normal flow, utilizing the pressure drop to maintain a closed flow system such that upon cessation of normal flow when the eduction line pressure is less than the induction line pressure by an amount not less than the predetermined pressure drop the vent is maintained closed, and draining water through the vent when the eduction pressure is less than the pressure by an amount less than the pressure differential established at cessation of normal flow, and discontinuing the draining upon resumption of the predetermined pressure differential.

6. The method of preventing backflow in a water distribution system in which water normally flows at a higher than atmospheric pressure to an eduction line from an induction line which comprises the steps of establishing a substantial predetermined drop in a zone between the lines during normal flow and at cessation of normal flow and draining said zone to the atmosphere when the eduction pressure is less than the induction pressure by an amount less than the predetermined differential, and discontinuing the draining upon resumption of the predetermined differential.

7. In a method of preventing backflow in a pipe system in which water normally flows at higher than atmospheric pressure from an induction line to an eduction line the steps of establishing a substantial predetermined pressure drop between the induction and eduction lines during normal flow and at cessation of normal flow, and maintaining the pressure in the eduction line lower than the pressure in the induction line by draining fluid from the eduction line to the atmosphere when the eduction pressure is less than the induction pressure by an amount less than the predetermined differential, and discontinuing the draining upon resumption of the predetermined differential.

FRANK CARLTON.